(12) United States Patent
Bierbower et al.

(10) Patent No.: US 10,795,636 B2
(45) Date of Patent: *Oct. 6, 2020

(54) INFORMATION DISPLAY REGARDING PLAYBACK QUEUE SUBSCRIPTIONS

(71) Applicant: Sonos, Inc., Santa Barbara, CA (US)

(72) Inventors: Chris Bierbower, Santa Barbara, CA (US); Philippe Vossel, Wuppertal (DE)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,908

(22) Filed: Jun. 14, 2019

(65) Prior Publication Data
US 2019/0294406 A1     Sep. 26, 2019

Related U.S. Application Data

(63) Continuation of application No. 15/890,565, filed on Feb. 7, 2018, now Pat. No. 10,324,680, which is a
(Continued)

(51) Int. Cl.
*G06F 3/16* (2006.01)
*G06F 16/438* (2019.01)
(Continued)

(52) U.S. Cl.
CPC ............ *G06F 3/16* (2013.01); *G06F 16/4387* (2019.01); *G11B 20/10527* (2013.01);
(Continued)

(58) Field of Classification Search
CPC ... G11B 19/025; G11B 27/02; G06F 3/04842; G06F 3/0482; G06F 3/165;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |

(Continued)

OTHER PUBLICATIONS

Advisory Action dated Aug. 7, 2017, issued in connection with U.S. Appl. No. 14/674,384, filed Mar. 31, 2015, 4 pages.
(Continued)

*Primary Examiner* — Andrew C Flanders
(74) *Attorney, Agent, or Firm* — McDonnell Boehnen Hulbert & Berghoff LLP

(57) ABSTRACT

Example techniques relate to playback queue subscriptions. An example implementation involves a computing system receiving, from a first computing device associated with a first user account, an instruction to enable subscription to a first playback queue associated with a first media playback system. In response to the instruction, the computing system enables second user accounts to subscribe to the first playback queue. The second user accounts are registered with respective second media playback systems in respective second household. The computing system receives, from a particular second media playback system, a request to subscribe to the first playback queue; and in response, sends one or more messages that update a control interface of the first control device to display a subscriber indication and (ii) sends one or more messages that populate a second playback queue of the particular second media playback system with audio tracks of the first playback queue.

20 Claims, 15 Drawing Sheets

Related U.S. Application Data continuation of application No. 14/674,384, filed on Mar. 31, 2015, now Pat. No. 9,891,880.

(51) Int. Cl.

| | | |
|---|---|---|
| *H04N 21/254* | (2011.01) | |
| *H04N 21/258* | (2011.01) | |
| *H04N 21/482* | (2011.01) | |
| *H04N 21/63* | (2011.01) | |
| *H04L 12/28* | (2006.01) | |
| *H04N 21/488* | (2011.01) | |
| *H04N 21/81* | (2011.01) | |
| *G11B 20/10* | (2006.01) | |
| *H04L 12/22* | (2006.01) | |

(52) U.S. Cl.
CPC .......... *H04L 12/22* (2013.01); *H04L 12/2827* (2013.01); *H04N 21/2541* (2013.01); *H04N 21/25875* (2013.01); *H04N 21/4825* (2013.01); *H04N 21/4882* (2013.01); *H04N 21/632* (2013.01); *H04N 21/8113* (2013.01); *G11B 2020/10546* (2013.01); *H04L 2012/2849* (2013.01)

(58) Field of Classification Search
CPC ............ G06F 16/4387; H04N 21/4825; H04N 21/182; H04N 21/43637; H04N 21/8113; H04N 21/26258; H04N 21/43615; H04N 21/632; H04N 21/2541; H04N 21/25875; H04L 2012/2849; H04L 12/2827; H04R 3/12; H04R 2227/005

See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,509,181 | B2 | 3/2009 | Champion |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,689,304 | B2 | 3/2010 | Sasaki |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,055,364 | B2 | 11/2011 | Champion |
| 8,103,009 | B2 | 1/2012 | McCarty et al. |
| 8,111,132 | B2 | 2/2012 | Allen et al. |
| 8,148,622 | B2 | 4/2012 | Rothkopf et al. |
| 8,214,740 | B2 | 7/2012 | Johnson |
| 8,234,395 | B2 | 7/2012 | Millington et al. |
| 8,407,623 | B2 | 3/2013 | Kerr et al. |
| 8,483,853 | B1 | 7/2013 | Lambourne |
| 8,495,197 | B1 | 7/2013 | Nagargadde et al. |
| 8,843,586 | B2 | 9/2014 | Pantos et al. |
| 8,942,252 | B2 | 1/2015 | Balassanian et al. |
| 8,954,177 | B2 | 2/2015 | Sanders |
| 8,966,394 | B2 | 2/2015 | Gates et al. |
| 9,137,602 | B2 | 9/2015 | Mayman et al. |
| 9,510,055 | B2 | 11/2016 | Kuper et al. |
| 9,674,587 | B2 | 6/2017 | Triplett et al. |
| 9,891,880 | B2 | 2/2018 | Bierbower et al. |
| 10,324,680 | B2 * | 6/2019 | Bierbower ................ G06F 3/16 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0129005 | A1 | 6/2007 | Goldberg et al. |
| 2007/0142944 | A1 | 6/2007 | Goldberg et al. |
| 2008/0060043 | A1 | 3/2008 | Malik |
| 2009/0210415 | A1 | 8/2009 | Martin et al. |
| 2013/0047084 | A1 | 2/2013 | Sanders et al. |
| 2013/0086003 | A1 | 4/2013 | Alsina et al. |
| 2013/0094667 | A1 | 4/2013 | Millington et al. |
| 2013/0167029 | A1 | 6/2013 | Friesen et al. |
| 2013/0251174 | A1 | 9/2013 | Lambourne |
| 2013/0336499 | A1 | 12/2013 | Beckhardt et al. |
| 2013/0347022 | A1 | 12/2013 | Bates et al. |
| 2014/0006483 | A1 | 1/2014 | Garmark et al. |
| 2014/0075308 | A1 | 3/2014 | Sanders et al. |
| 2014/0108929 | A1 | 4/2014 | Garmark et al. |
| 2014/0123005 | A1 | 5/2014 | Forstall et al. |
| 2014/0140530 | A1 | 5/2014 | Gomes-Casseres et al. |
| 2014/0331133 | A1 | 11/2014 | Coburn et al. |
| 2014/0378056 | A1 | 12/2014 | Liu et al. |
| 2015/0026613 | A1 | 1/2015 | Kwon et al. |
| 2015/0074527 | A1 | 3/2015 | Sevigny et al. |
| 2015/0074528 | A1 | 3/2015 | Sakalowsky et al. |
| 2015/0256954 | A1 | 9/2015 | Carlsson et al. |

FOREIGN PATENT DOCUMENTS

| | | |
|---|---|---|
| WO | 2003093950 A2 | 11/2003 |
| WO | 2014149533 A2 | 9/2014 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated May 10, 2017, issued in connection with U.S. Appl. No. 14/674,384, filed Mar. 31, 2015, 14 pages.
First Action Interview Office Action dated Nov. 23, 2016, issued in connection with U.S. Appl. No. 14/674,384, filed Mar. 31, 2015, 7 pages.
International Searching Authority, International Search Report and Written Opinion dated Jun. 16, 2016, issued in connection with International Application No. PCT/US2016/024726, filed on Mar. 29, 2016, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Kreitz et al., "Spotify—Large Scale, Low Latency, P2P Music-on-Demand Streaming," 2010 IEEE Tenth International Conference on Peer-to-Peer Computing (P2P), Aug. 25, 2010, pp. 1-10.

(56) References Cited

OTHER PUBLICATIONS

Louderback, Jim, "Affordable Audio Receiver Furnishes Homes With MP3," TechTV Vault. Jun. 28, 2000 retrieved Jul. 10, 2014, 2 pages.
Non-Final Office Action dated Aug. 10, 2018, issued in connection with U.S. Appl. No. 15/890,565, filed Feb. 7, 2018, 6 pages.
Notice of Allowance dated Oct. 2, 2017, issued in connection with U.S. Appl. No. 14/674,384, filed Mar. 31, 2015, 5 pages.
Notice of Allowance dated Jan. 25, 2019, issued in connection with U.S. Appl. No. 15/890,565, filed Feb. 7, 2018, 5 pages.
Palm, Inc., "Handbook for the Palm VII Handheld," May 2000, 311 pages.
Preinterview First Office Action dated Jun. 9, 2016, issued in connection with U.S. Appl. No. 14/674,384, filed Mar. 31, 2015, 5 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

US 10,795,636 B2

INFORMATION DISPLAY REGARDING PLAYBACK QUEUE SUBSCRIPTIONS

CROSS-REFERENCE TO RELATED APPLICATIONS

This application claims priority under 35 U.S.C. § 120 to, and is a continuation of, U.S. non-provisional patent application Ser. No. 15/890,565, filed on Feb. 7, 2018, entitled "Information Display Regarding Playback Queue Subscriptions," which is incorporated herein by reference in its entirety.

U.S. non-provisional patent application Ser. No. 15/890, 565 claims priority under 35 U.S.C. § 120 to, and is a continuation of, U.S. non-provisional patent application Ser. No. 14/674,384, filed on Mar. 31, 2015, entitled "Information Display Regarding Playback Queue Subscriptions," and issued as U.S. Pat. No. 9,891,880 on Feb. 13, 2018, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
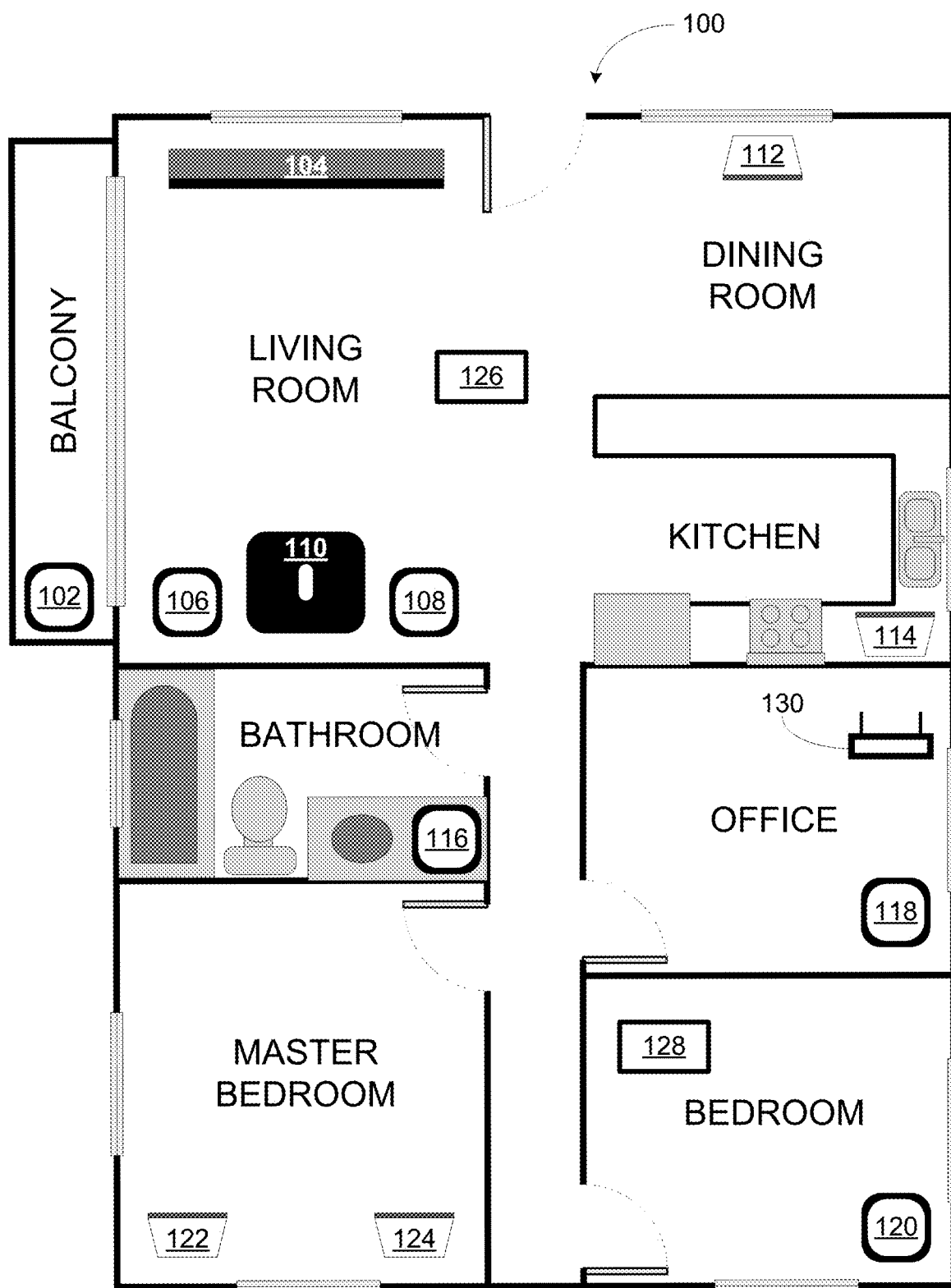
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In various embodiments, a first playback device associated with a first user-account plays media content from a playback queue. Further, the first playback device may allow a second user-account to subscribe to the playback queue so that a second playback device associated with the second user-account may play the media content contemporaneously with the first playback device. In this context, it may be useful for a control device associated with the first user-account to provide an intuitive user interface for display of information regarding the second user-account's use of the playback queue.

The control device may be used to control operations of the first playback device and also display an indication that the second user-account is subscribing to the playback queue and/or that the second playback device is playing media content from the playback queue. This facilitates a collaborative and interactive listening experience as well as provides specific feedback to the first user-account as to which user-accounts are subscribing to the playback queue.

In some examples, the first playback device may allow multiple user-accounts to subscribe to the playback queue. Here, the control device may also display an indicator of how many user-accounts are subscribed to the playback queue. By monitoring trends in how many user-accounts are subscribing to the playback queue, it may be possible to modify the contents of the playback queue to attract more user-accounts to subscribe to the playback queue.

Accordingly, some examples described herein involve, among other things, a control device configuring a first playback device associated with a first user-account to (i) play media content from a playback queue comprising one or more audio tracks stored at a network location and (ii) enable one or more other user-accounts associated with other playback devices to subscribe to the playback queue; the control device receiving a subscription indication that a second user-account associated with a second playback device has subscribed to the playback queue; and in response to receiving the subscription indication, the control device displaying a subscriber indicator showing that the second user-account has subscribed to the playback queue. Other aspects of the examples will be made apparent in the remainder of the description herein.

In one aspect, an example non-transitory computer-readable medium stores instructions that, when executed by a control device, cause the control device to perform functions. The functions comprise configuring a first playback device associated with a first user-account to (i) play media content from a playback queue comprising one or more audio tracks stored at a network location and (ii) enable one or more other user-accounts associated with other playback devices to subscribe to the playback queue. The functions further comprise receiving a subscription indication that a second user-account associated with a second playback device has subscribed to the playback queue. The functions further comprise, in response to receiving the subscription indication, displaying a subscriber indicator on the control device showing that the second user-account has subscribed to the playback queue.

In yet another aspect, an example control device includes one or more processors and a non-transitory computer-readable medium storing instructions that, when executed by the one or more processors, cause the control device to perform functions. The functions comprise configuring a first playback device associated with a first user-account to (i) play media content from a playback queue comprising one or more audio tracks stored at a network location and (ii) enable one or more other user-accounts associated with other playback devices to subscribe to the playback queue. The functions further comprise receiving a subscription indication that a second user-account associated with a second playback device has subscribed to the playback queue. The functions further comprise, in response to receiving the subscription indication, displaying a subscriber indicator on the control device showing that the second user-account has subscribed to the playback queue.

In yet another aspect, an example method performed by a control device includes configuring a first playback device associated with a first user-account to (i) play media content from a playback queue comprising one or more audio tracks stored at a network location and (ii) enable one or more other user-accounts associated with other playback devices to subscribe to the playback queue. The method further comprises receiving a subscription indication that a second user-account associated with a second playback device has subscribed to the playback queue. The method further comprises, in response to receiving the subscription indication, displaying a subscriber indicator on the control device showing that the second user-account has subscribed to the playback queue.

In yet another aspect, an example non-transitory computer-readable medium stores instructions that, when executed by a control device, cause the control device to perform functions. The control device is configured to control a first playback system that comprises (i) a first group of one or more playback devices and (ii) a second group of one or more playback devices. The functions comprise receiving a notification that a second playback system associated with a second user-account is accessing a first playback queue of the first group of playback devices. The first playback system and the control device are associated with a first user-account. The functions further comprise displaying a first indication that the second playback system is accessing the first playback queue. The functions further comprise receiving a command for the second group of playback devices to access a second playback queue of a third playback system. The third playback system is associated with a third user-account. The functions further comprise, based on receiving the command, configuring the second group of playback devices to access the second playback queue. The functions further comprise displaying a second indication that the second group of playback devices is accessing the second playback queue.

In yet another aspect, an example control device includes one or more processors and a non-transitory computer-readable medium storing instructions that, when executed by the one or more processors, cause the control device to perform functions. The control device is configured to control a first playback system that comprises (i) a first group of one or more playback devices and (ii) a second group of one or more playback devices. The functions comprise receiving a notification that a second playback system associated with a second user-account is accessing a first playback queue of the first group of playback devices. The first playback system and the control device are associated with a first user-account. The functions further comprise displaying a first indication that the second playback system is accessing the first playback queue. The functions further comprise receiving a command for the second group of playback devices to access a second playback queue of a third playback system. The third playback system is associated with a third user-account. The functions further comprise, based on receiving the command, configuring the second group of playback devices to access the second playback queue. The functions further comprise displaying a second indication that the second group of playback devices is accessing the second playback queue.

In yet another aspect, an example method is performed by a control device configured to control a first playback system that comprises (i) a first group of one or more playback devices and (ii) a second group of one or more playback devices. The method comprises receiving a notification that a second playback system associated with a second user-account is accessing a first playback queue of the first group of playback devices. The first playback system and the control device are associated with a first user-account. The method further comprises displaying a first indication that the second playback system is accessing the first playback queue. The method further comprises receiving a command for the second group of playback devices to access a second playback queue of a third playback system. The third playback system is associated with a third user-account. The method further comprises, based on receiving the command, configuring the second group of playback devices to access the second playback queue. The method further comprises displaying a second indication that the second group of playback devices is accessing the second playback queue.

In yet another aspect, an example non-transitory computer-readable medium stores instructions that, when executed by a control device, cause the control device to perform functions. The control device is configured to control a first playback system that comprises (i) a first group of one or more playback devices and (ii) a second group of one or more playback devices. The functions comprise receiving a first notification that a second playback system associated with a second user-account is accessing a first playback queue of the first group of playback devices. The first playback system and the control device are associated with a first user-account. The functions further comprise displaying a first indication that the second playback system is accessing the first playback queue. The functions further comprise receiving a second notification that a third playback system associated with a third user-account is accessing a second playback queue of the second group of playback devices. The functions further comprise displaying a second indication that the third playback system is accessing the second playback queue.

In yet another aspect, an example control device includes one or more processors and a non-transitory computer-readable medium storing instructions that, when executed by the one or more processors, cause the control device to perform functions. The control device is configured to control a first playback system that comprises (i) a first group of one or more playback devices and (ii) a second group of one or more playback devices. The functions comprise receiving a first notification that a second playback system associated with a second user-account is accessing a first playback queue of the first group of playback devices. The first playback system and the control device are associated with a first user-account. The functions further comprise displaying a first indication that the second playback system is accessing the first playback queue. The functions further comprise receiving a second notification that a third playback system associated with a third user-account is accessing a second playback queue of the second group of playback devices. The functions further comprise displaying a second indication that the third playback system is accessing the second playback queue.

In yet another aspect, an example method is performed by a control device configured to control a first playback system that comprises (i) a first group of one or more playback devices and (ii) a second group of one or more playback devices. The method comprises receiving a first notification that a second playback system associated with a second user-account is accessing a first playback queue of the first group of playback devices. The first playback system and the control device are associated with a first user-account. The method further comprises displaying a first indication that the second playback system is accessing the first playback queue. The method further comprises receiving a second notification that a third playback system associated with a third user-account is accessing a second playback queue of the second group of playback devices. The method further comprises displaying a second indication that the third playback system is accessing the second playback queue.

In yet another aspect, an example non-transitory computer-readable medium stores instructions that, when executed by a control device, cause the control device to perform functions. The control device is configured to control a first playback system that comprises (i) a first group of one or more playback devices and (ii) a second group of one or more playback devices. The first playback system and the control device are associated with a first user-account. The functions comprise receiving a first command for the first group of playback devices to access a first playback queue of a second playback system. The second playback system is associated with a second user-account. The functions further comprise, based on receiving the first command, configuring the first group of playback devices to access the first playback queue. The functions further comprise displaying a first indication that the first group of playback devices is accessing the first playback queue. The functions further comprise receiving a second command for the second group of playback devices to access a second playback queue of a third playback system. The third playback system is associated with a third user-account. The functions further comprise, based on receiving the second command, configuring the second group of playback devices to access the second playback queue. The functions further comprise displaying a second indication that the second group of playback devices is accessing the second playback queue.

In yet another aspect, an example control device includes one or more processors and a non-transitory computer-readable medium storing instructions that, when executed by the one or more processors, cause the control device to perform functions. The control device is configured to control a first playback system that comprises (i) a first group of one or more playback devices and (ii) a second group of one or more playback devices. The first playback system and the control device are associated with a first user-account. The functions comprise receiving a first command for the first group of playback devices to access a first playback queue of a second playback system. The second playback system is associated with a second user-account. The functions further comprise, based on receiving the first command, configuring the first group of playback devices to access the first playback queue. The functions further comprise displaying a first indication that the first group of playback devices is accessing the first playback queue. The functions further comprise receiving a second command for the second group of playback devices to access a second playback queue of a third playback system. The third playback system is associated with a third user-account. The functions further comprise, based on receiving the second command, configuring the second group of playback devices to access the second playback queue. The functions further comprise displaying a second indication that the second group of playback devices is accessing the second playback queue.

In yet another aspect, an example method is performed by a control device configured to control a first playback system that comprises (i) a first group of one or more playback devices and (ii) a second group of one or more playback devices. The first playback system and the control device are associated with a first user-account. The method comprises receiving a first command for the first group of playback devices to access a first playback queue of a second playback system. The second playback system is associated with a second user-account. The method further comprises, based on receiving the first command, configuring the first group of playback devices to access the first playback queue. The method further comprises displaying a first indication that the first group of playback devices is accessing the first playback queue. The method further comprises receiving a second command for the second group of playback devices to access a second playback queue of a third playback system. The third playback system is associated with a third user-account. The method further comprises, based on receiving the second command, configuring the second group of playback devices to access the second playback queue. The method further comprises displaying a second indication that the second group of playback devices is accessing the second playback queue.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102, 104, 106, 108, 110, 112, 114, 116, 118, 120, 122, and 124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
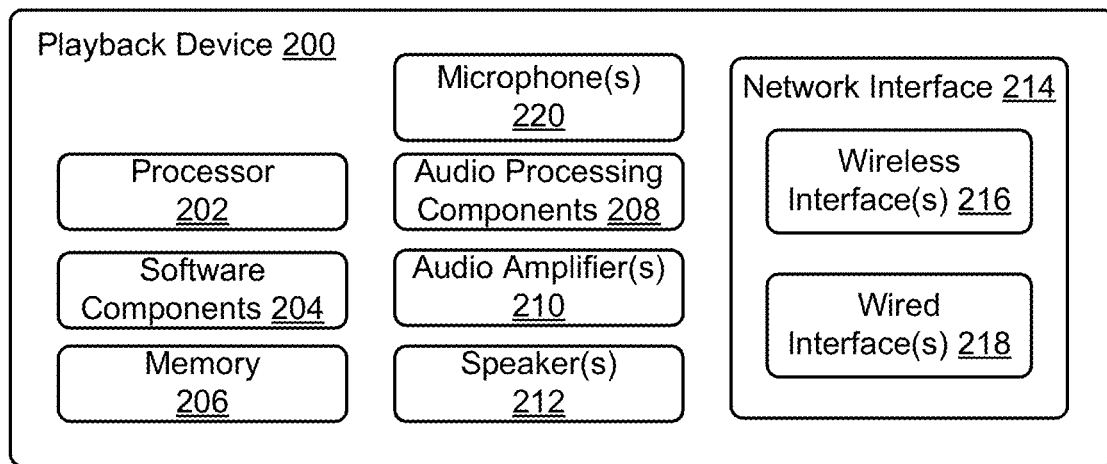
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being played by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
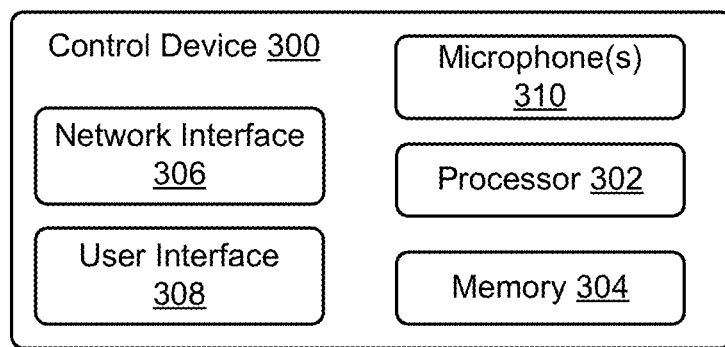
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
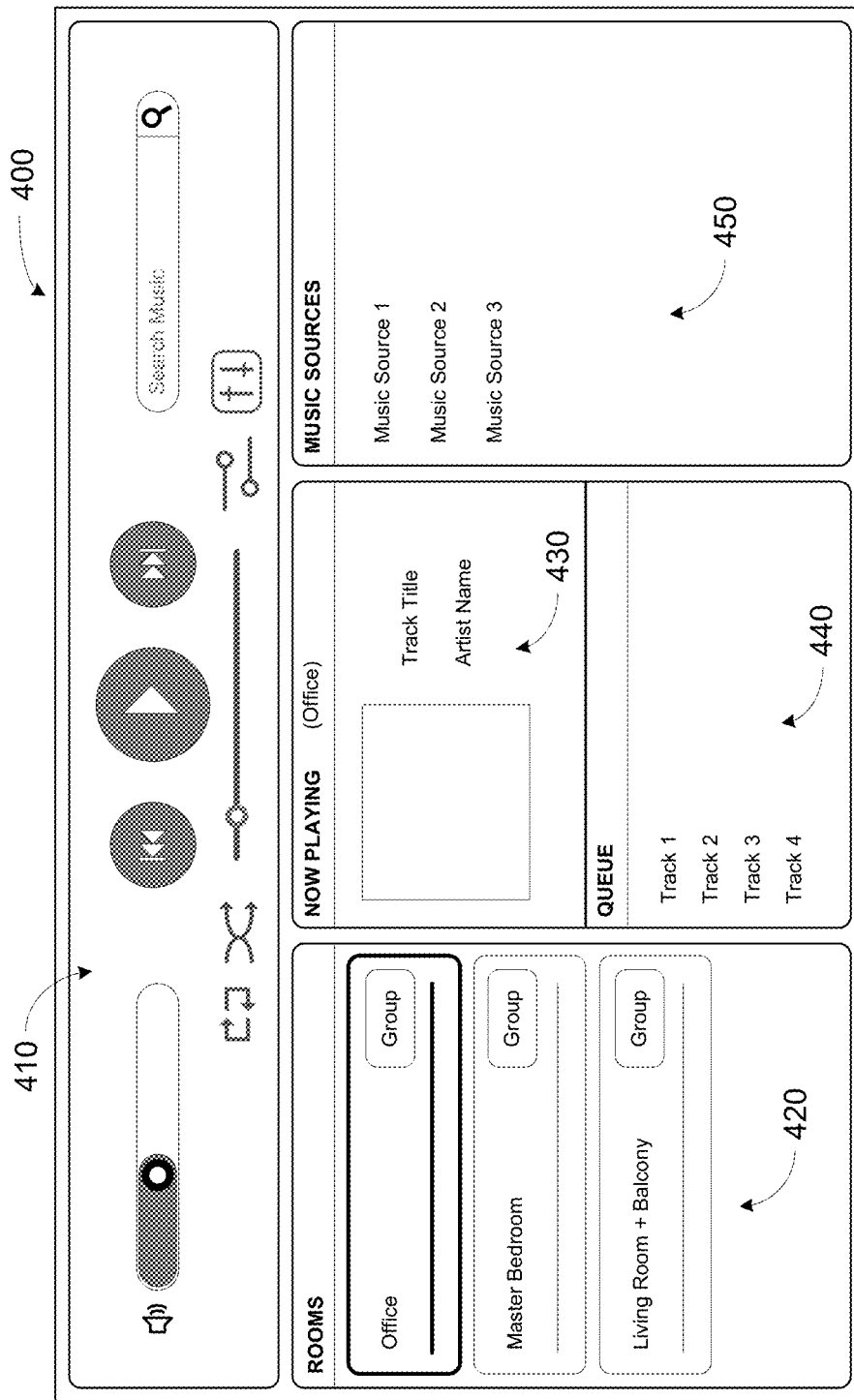
FIG. 4 shows an example controller interface.
Figure 5:
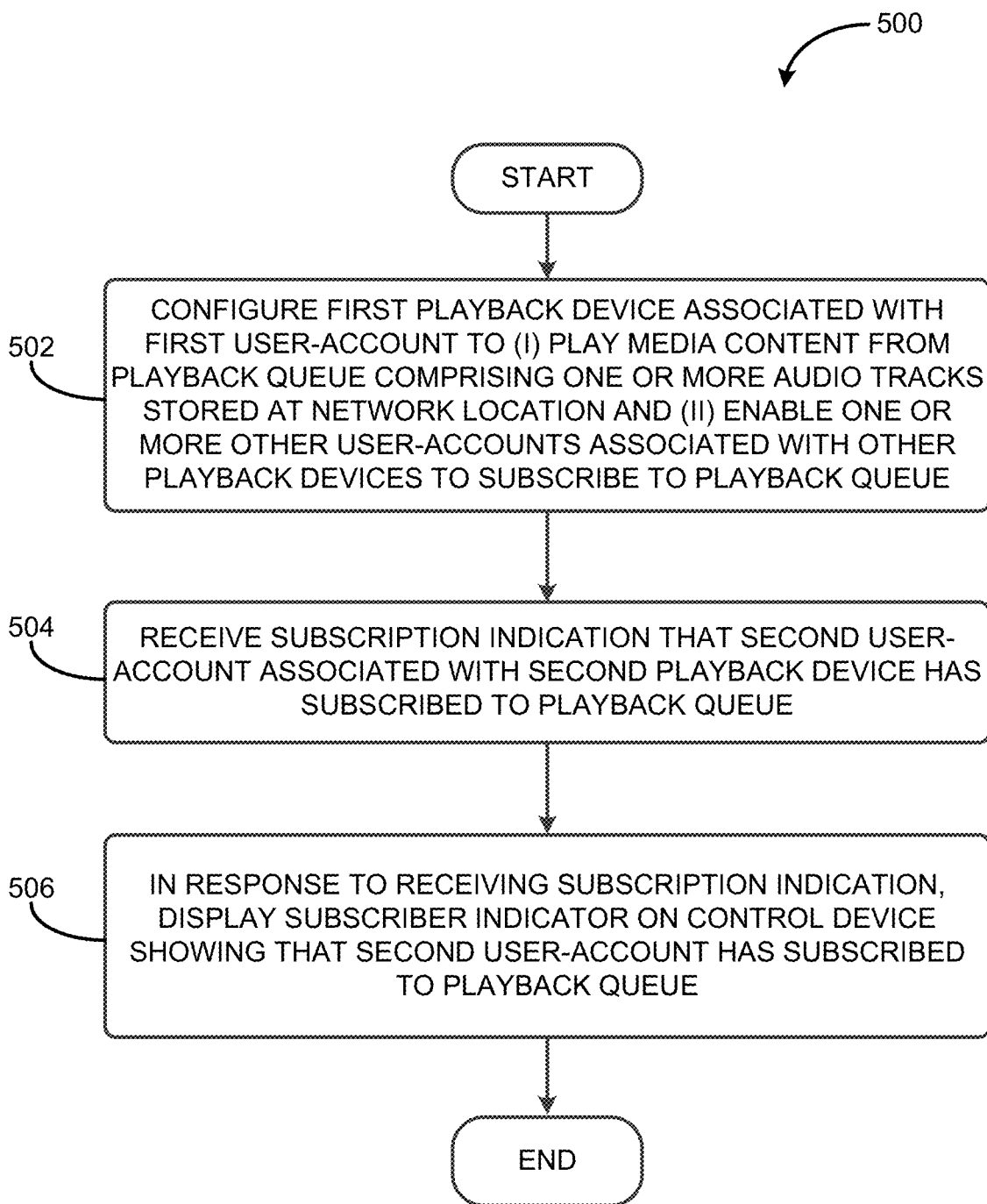
FIG. 5 shows a flow diagram for an example method.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods Related to Information Display Regarding Playback Queue Subscriptions As discussed above, some examples described herein involve, among other things, a control device configuring a first playback device associated with a first user-account to (i) play media content from a playback queue comprising one or more audio tracks stored at a network location and (ii) enable one or more other user-accounts associated with other playback devices to subscribe to the playback queue; the control device receiving a subscription indication that a second user-account associated with a second playback device has subscribed to the playback queue; and in response to receiving the subscription indication, the control device displaying a subscriber indicator showing that the second user-account has subscribed to the playback queue. Other aspects of the examples will be made apparent in the remainder of the description herein.

Methods 500, 700, 900, and 1100 respectively shown in FIGS. 5, 7, 9, 11A, and 11B present example methods that can be implemented within an operating environment involving, for example, one or more of the media playback system 100 of FIG. 1, one or more of the playback device 200 of FIG. 2, and one or more of the control device 300 of FIG. 3. Methods 500, 700, 900, and 1100 may include one or more operations, functions, or actions as illustrated by one or more of blocks 502, 504, 506, 702, 704, 706, 708, 710, 902, 904, 906, 908, 1102, 1104, 1106, 1108, 1110, and 1112. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500, 700, 900, and 1100, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache, and Random Access Memory (RAM). The computer-readable medium may also include non-transitory media, such as secondary or persistent long-term storage, like read-only memory (ROM), optical or magnetic disks, compact-disc read-only memory (CD-ROM), for example. The computer-readable media may also be any other volatile or non-volatile storage systems. The computer-readable medium may be considered a computer-readable storage medium, for example, or a tangible storage device. In addition, for the methods 500, 700, 900, and 1100 and other processes and methods disclosed herein, each block in FIGS. 5, 7, 9, 11A, and 11B may represent circuitry that is wired to perform the specific logical functions in the process.

At block 502, the method 500 includes configuring a first playback device associated with a first user-account to (i) play media content from a playback queue comprising one or more audio tracks stored at a network location and (ii) enable one or more other user-accounts associated with other playback devices to subscribe to the playback queue.

Figure 6A:
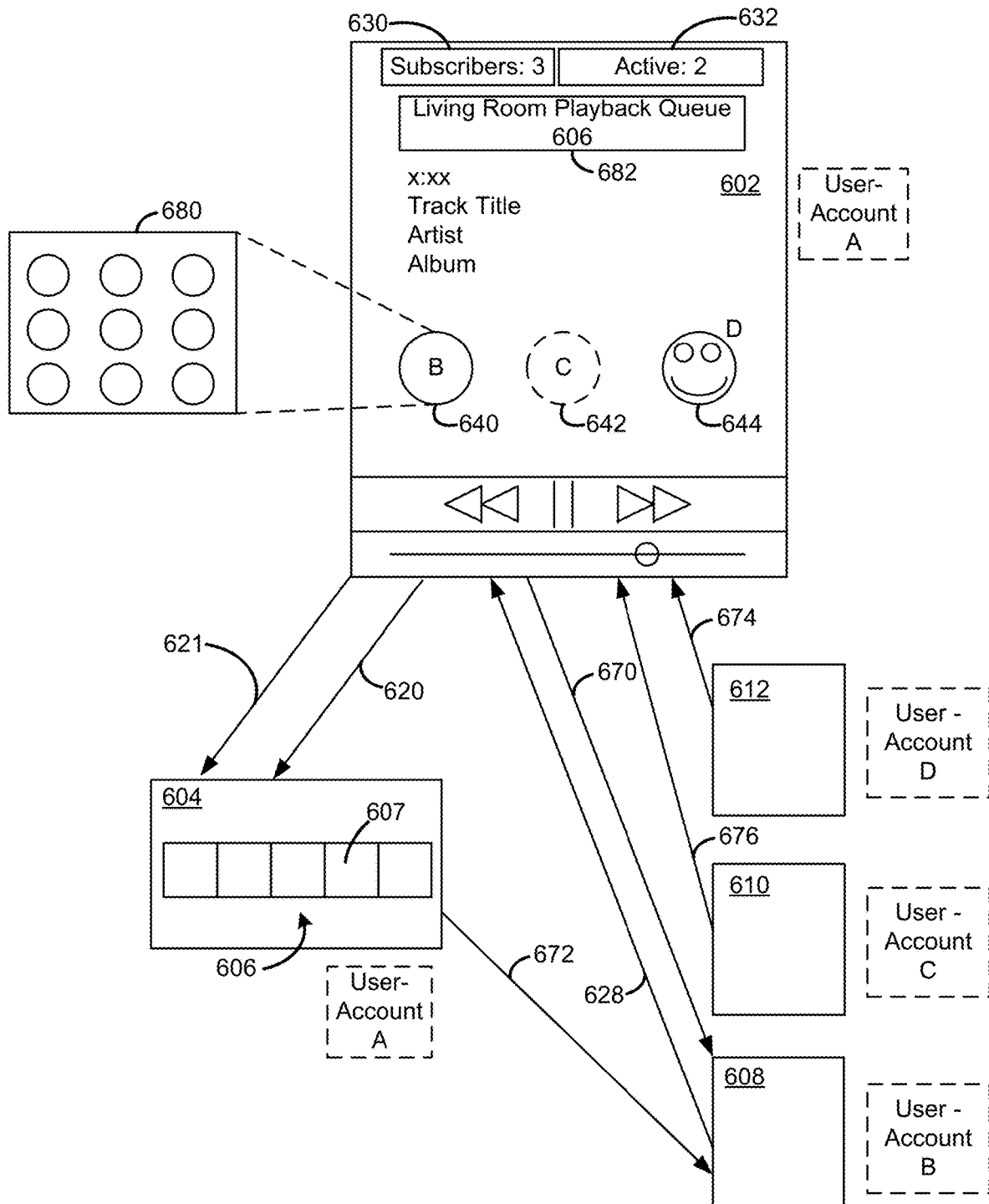
FIG. 6A shows functions performed example playback devices and an example control device.

Referring to FIG. 6A as an example, the control device 602 may be configured to control a "living room" playback zone that includes the playback device 604. The control device 602 and the playback device 604 are associated with the user-account A, the playback device 608 is associated with the user-account B, the playback device 610 is associated with the user-account C, and the playback device 612 is associated with the user-account D.

The control device 602 may send a command 620 to the playback device 604, configuring the playback device 604 to (i) play media content from the playback queue 606 and (ii) enable user-accounts B, C, and D to subscribe to the playback queue 606, thereby allowing the playback devices 608, 610, and 612 to access the playback queue 606. In some examples, the command 620 may cause the playback device 604 to make the playback queue 606 publically available to any user-account, not just user-accounts specified by the command 620.

In some examples, the playback queue 606 is stored at the playback device 604, but in other examples the playback queue 606 is stored at another playback device or at a server (not shown). In some embodiments, the server is associated with the user-accounts A, B, C, and D. The playback queue 606 may include uniform resource locators (URLs), uniform resource identifiers (URIs), or any other data identifying respective network locations for one or more audio tracks. In other examples, the playback queue 606 includes the one or more audio tracks themselves. Accordingly, the playback device 604 (individually or in combination with control device 602) may provide, to the playback devices 608, 610, and 612, a network location of the playback queue 606. Alternatively, if the playback queue 606 is located at the playback device 604, the playback device 604 may allow the playback devices 608, 610, and 612 to access the playback queue 606 at the playback device 604.

At block 504, the method 500 includes receiving a subscription indication that a second user-account associated with a second playback device has subscribed to the playback queue. For example, the control device 602 may receive subscription indication 628 from the playback device 608 which indicates that the user-account B has subscribed to the playback queue 606. The subscription indication 628 may specifically identify the user-account B, the playback device 608, and/or the playback queue 606. In other examples, the subscription indication may be received from the playback device 604 in response to the playback device 604 receiving an indication from the playback device 608 that the user-account B has subscribed to the playback queue 606. The control device 602 may receive the subscription indication from other devices as well. For example, the control device 602 may receive the subscription indication from a server configured to communicate status information regarding playback queue subscriptions between different playback devices and/or different user-accounts.

At block 506, the method 500 includes, in response to receiving the subscription indication, displaying a subscriber indicator on the control device showing that the second user-account has subscribed to the playback queue. For example, the control device 602 may display the subscriber indicator 640 which indicates that the user-account B has subscribed to the playback queue 606. The subscriber indicator 640 may be a pictorial representation recognizable to a user of control device 602 as corresponding to the user-account B, or an avatar or a photo of a user associated with user-account B. The subscriber indicator 640 may appear in a first state—represented by a solid line in FIG. 6A—indicating that the user-account B is subscribed to the playback queue 606 and is currently accessing the playback queue 606 for playback of media content.

The method 500 may further include displaying a global indicator that indicates a quantity of user-accounts that are subscribed to the playback queue. For example, the control device 602 may display the global indicator 630, which indicates that there are three user-accounts, namely user-accounts B, C, and D that are subscribed to the playback queue 606. In this example, user-accounts B, C, and D are subscribed to the playback queue 606 but might or might not be currently accessing the playback queue 606 to play audio content. More specifically, the global indicator 630 may show a total number of user-accounts that are subscribed to the playback queue 606, whether or not the subscribed user-accounts are actually accessing the playback queue 606.

The method 500 may further include displaying an active account indicator that indicates a quantity of user-accounts that are subscribed to the playback queue and are currently accessing an audio track of the playback queue for playback. For example, the active account indicator 632 indicates that there are two user-accounts, namely user-accounts B and D that are subscribed to the playback queue 606 and are currently accessing an audio track of the playback queue 606 for playback. For example, even though the user-account C is subscribed to the playback queue 606, the user-account C might not be accessing the playback queue 606 for playback of audio content. As a result, the active account indicator 632 indicates that only two user accounts (B and D) are currently accessing the playback queue 606.

Generally, the global indicator and the active account indicator may be presented in any manner that indicates, explicitly or implicitly, (i) the quantity of user-accounts that are subscribed to the playback queue and (ii) the quantity of user-accounts that are accessing an audio track of the playback queue. In some embodiments, the global indicator and the active account indicator may together explicitly indicate (i) the quantity of user-accounts that are subscribed to the playback queue and (ii) the quantity of user-accounts that are subscribed to the playback queue 606 and are not currently accessing an audio track of the playback queue 606. In other embodiments, the global indicator and the active account indicator may together explicitly indicate (i) the quantity of user-accounts that are subscribed to the playback queue and are not currently accessing an audio track of the playback queue 606 and (ii) the quantity of user-accounts that are subscribed to the playback queue and are currently accessing an audio track of the playback queue 606.

The method 500 may further include receiving a command to play a particular audio track from the playback queue; and in response to receiving the command, configuring the first playback device to play the particular audio track. In this context, playback of the particular audio track by the first playback device may cause the second playback device to also play the particular audio track at the substantially same time as the first playback device.

For example, the control device 602 may receive the command via a user interface such as a touchscreen. In some examples, the user interface may resemble controller interface 400 of FIG. 4. The command may be a "play current track" command, a "play next track" command, a "play previous track" command, or may be a command to play a specific audio track listed in the playback queue section 440, for example. In response to receiving the command, the control device 602 may control the playback device 604 to play track 607 of the playback queue 606, for example. In some embodiments this causes the playback device 604 to coordinate with the playback device 608 so that the playback device 608 plays the track 607 at substantially the same time as the playback device 604. For example, the playback device 604 (or an intermediary server) may provide, to the playback device 608, timing information for playback of the track 607 that the playback device 608 will then use to play back track 607 at substantially the same time as playback device 604.

In some embodiments, the playback devices 604 and 608 may be located in different locations that are sufficiently far from each other such that a person who hears audio from playback device 604 cannot hear audio from playback device 608, and vice versa. For example, the playback device 604 may be included in a first playback system comprising one or more playback devices in a first household and the playback device 608 may be included in a second playback system comprising one or more playback devices in a second household. In such a scenario, it is not necessary for the playback devices 604 and 608 to play audio in synchrony in the same manner that two playback devices in the same location might play audio content in synchrony as described previously herein. Therefore, in some embodiments, playback devices 604 and 608 may play audio track 607 at substantially the same time, but perhaps not necessarily in synchrony as described herein. However, in other embodiments the playback devices 604 and 608 may play audio track 607 in synchrony as described herein, even though such tightly-coordinated synchronous playback may not be required in all situations.

Figure 6B:
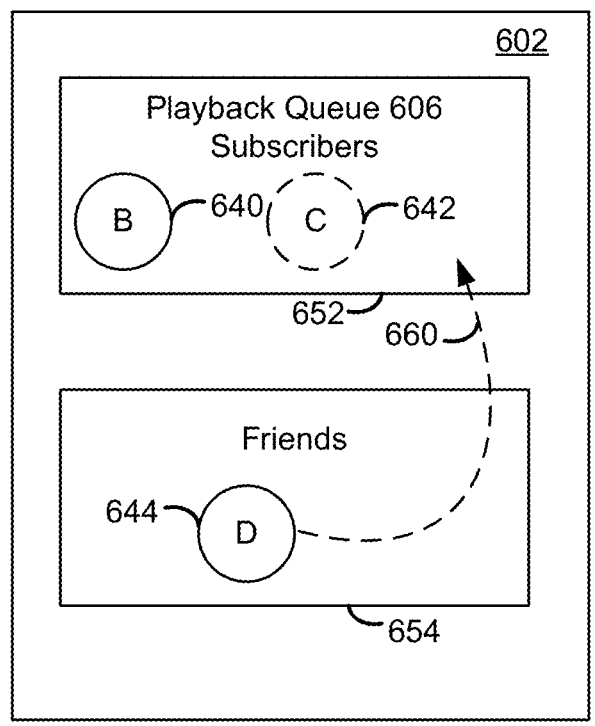
FIG. 6B shows functions performed by an example control device.

Referring to FIG. 6B as an example, the control device 602 is shown operating in a subscription management mode. The control device 602 is shown displaying a subscriber region 652 and an additional user-accounts region 654 within a touchscreen. Subscriber indicators 640 and 642 are displayed within the subscriber region 652, indicating that the user-accounts B and C are currently enabled to subscribe to the playback queue 606. The subscriber indicator 644 is displayed within the additional user-accounts region 654, indicating that the user-account D is not currently enabled to subscribe to the playback queue 606. (In other embodiments, a particular playback queue can be made publically available for any user-account to subscribe to.)

In this context, the method 500 may further include, prior to configuring the first playback device to enable the one or more other user-accounts to subscribe to the playback queue, receiving a command to enable the one or more other user-accounts to subscribe to the playback queue; and in response to receiving the command, configuring the first playback device to enable the one or more other user-accounts to subscribe to the playback queue.

For example, prior to configuring the playback device 604 to enable the user-account B to subscribe to the playback queue 606, the control device 602 may receive a command to enable the user-accounts B, C, and D to subscribe to the playback queue 606. Such a command may take the form of a series of touch-and-drag inputs. For example, a touch input may be received at the subscriber indicator 644, and the subscriber indicator 644 may be dragged from the additional user-accounts region 654 into the subscriber region 652, as depicted at 660. The subscriber indicators 640 and 642 may have similarly been dragged from the additional user-accounts region 654 into the subscriber region 652, thereby enabling the user-accounts B and C to subscribe to the playback queue 606.

The method 500 may further include, prior to receiving the subscription indication, sending a message to the second playback device indicating that the second user-account is enabled to subscribe to the playback queue. For example, as shown in FIG. 6A, the control device 602 may send message 670 to the playback device 608 (or a controller configured to control playback device 608) indicating that the user-account B is enabled to subscribe to the playback queue 606.

The method 500 may further include, prior to receiving the subscription indication, causing the first playback device to inform the second playback device that the second user-account is enabled to subscribe to the playback queue. For example, the control device 602 may send a command 621 to the playback device 604 causing the playback device 604 to send a message 672 to the playback device 608. The message 672 may indicate that the user-account B is enabled to subscribe to the playback queue 606.

The method 500 may further include receiving an inactivity indication that the second user-account is subscribed to the playback queue but the second playback device is not currently playing an audio track from the playback queue; and displaying a subscriber indicator on the control device showing that the second user-account has subscribed to the playback queue but the second playback device is not currently playing an audio track from the playback queue.

As an example, the control device 602 may receive an indication 676 from the playback device 610 that the user-account C is subscribed to the playback queue 606 but is not currently playing an audio track from the playback queue 606. In response, the control device 602 may display the subscriber indicator 642 that indicates that the user-account C is subscribed to the playback queue 606 but is not currently playing an audio track from the playback queue 606. The subscriber indicator 642 may so indicate by appearing in a second state as indicated by the dashed lines of subscriber indicator 642.

The method 500 may further include receiving data representing feedback from the second user-account. The feedback may be associated with an audio track of the playback queue. In this context, the method 500 may further include displaying an indicator that represents the feedback.

For example, the control device 602 may receive feedback data 674 from the user-account D via the playback device 612 or perhaps a control device configured to control playback device 612. The feedback data 674 may include textual or graphical information indicating user sentiment regarding an audio track of the playback queue 606. For example, the feedback data may include information such as "I like this track" or various emoticons representing any positive, negative, or neutral sentiments. As an example, upon receiving the feedback data 674 the control device 602 may display a subscriber indicator 644 indicating that a user associated with user-account D has positive feelings while listening to the audio track of the playback queue 606 being played by the playback device 612.

The method 500 may further include receiving an input representing a selection of the subscriber indicator; and in response to receiving the input, providing a user-interface for sending a message to the second user-account.

The method 500 may further include displaying an emoticon via the user-interface; receiving, via the user-interface, an input representing a selection of the emoticon; and sending, to the second playback device or to a second control device configured to control the second playback device, data representing the emoticon.

For example, a touchscreen of the control device 602 may receive touch input at the subscriber indicator 640, and in response, the control device 602 may display messaging user-interface 680. As shown in FIG. 6A, the messaging user-interface 680 provides nine emoticons representing various sentiments to be expressed to a user associated with the user-account B. By receiving touch input at a given emoticon of the messaging user-interface 680, the control device 602 may send a message to the playback device 608 or a control device (not shown) configured to control the playback device 608. The message (not shown) may indicate the selected emoticon or include other data representing the sentiment corresponding to the selected emoticon.

In other examples, the messaging user-interface 680 may be a touchscreen keyboard for receiving input representing a textual message for the user associated with user-account B. In such a case, the control device 602 may send data representing the textual message to the playback device 608 or a control device (not shown) configured to control the playback device 608.

The method 500 may further include displaying a playback queue indicator that identifies the playback queue. For example, the control device 602 may display the queue indicator 682. The queue indicator 682 indicates that the playback queue 606 corresponds to a "living room" playback zone comprising the playback device 604 and possibly other playback devices. In some examples, the control device 602 may, in response to receiving appropriate control input, display subscriber indicator(s), global indicator(s), and active account indicator(s) that provide information pertaining to another playback queue that corresponds to another playback zone or group of playback devices.

Figure 7:
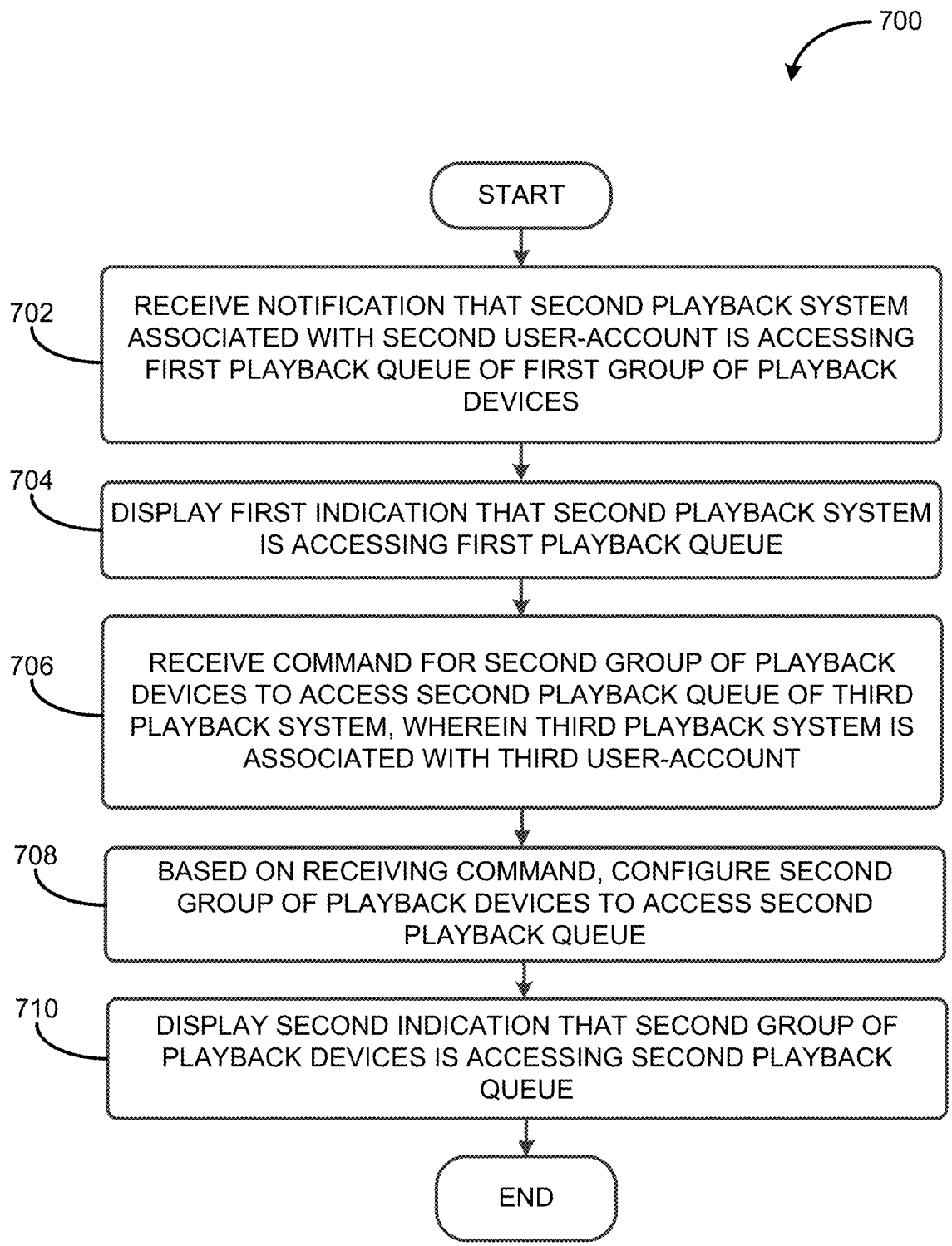
FIG. 7 shows a flow diagram for an example method.

Referring to FIG. 7, the method 700 may be performed by a control device configured to control a first playback system. In some embodiments, the first playback system comprises a first group of one or more playback devices and a second group of one or more playback devices.

Figure 8A:
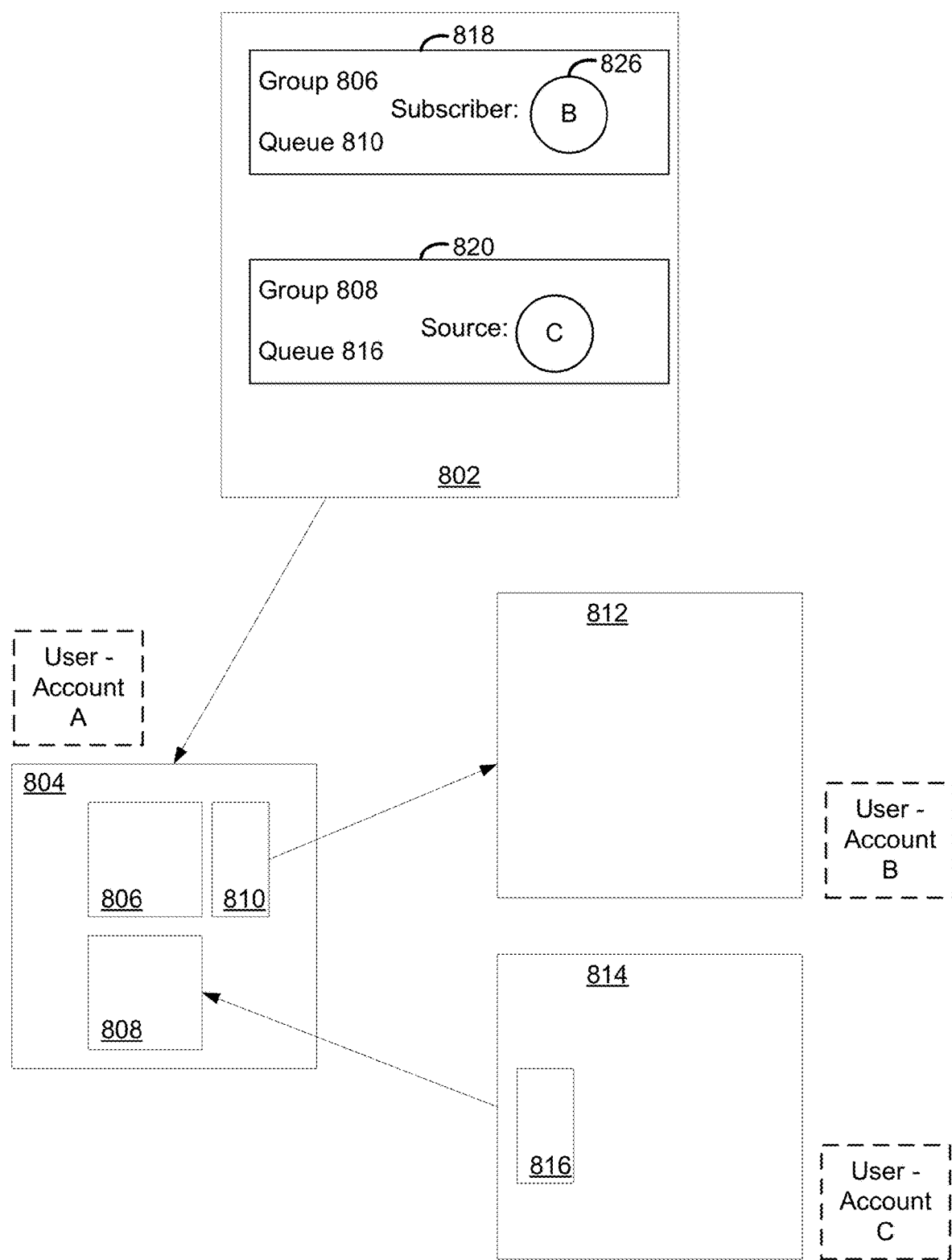
FIG. 8A shows functions performed by example playback systems and an example control device.

As an example, FIG. 8A depicts a control device 802 that is configured to control a playback system 804. The playback system 804 is associated with user-account A and includes a group 806 of one or more playback devices and a group 808 of one or more playback devices. The group 806 is configured to access the playback queue 810 for playback of audio content. FIG. 8 also includes playback system 812 which is associated with user-account B and playback system 814 which is associated with user-account C. The playback system 814 is configured to access the playback queue 816 for playback of audio content.

At block 702, the method 700 includes receiving a notification that a second playback system associated with a second user-account is accessing a first playback queue of the first group of playback devices. In this context, the first playback system and the control device may be associated with a first user-account.

Referring to FIG. 8A for example, the control device 802 may receive a notification from the playback system 804 or from the playback system 812. The notification may indicate that the playback system 812 is accessing the playback queue 810. For example, the playback system 812 may send the notification to the control device 802 as the playback system 812 is accessing the playback queue 810. Alternatively, the playback system 804 may detect that the playback system 812 is accessing the playback queue 810 and send the notification to the control device 802 in response.

At block 704, the method 700 includes displaying a first indication that the second playback system is accessing the first playback queue.

For instance, the control device 802 may display indication 818, which shows that the playback system 812 is accessing the playback queue 810. The indication may explicitly identify the playback system 812, or as shown in FIG. 8A the indication 818 may identify user-account B which is associated with the playback system 812. The indication 818 may indicate that the group 806 is also accessing the playback queue 810.

At block 706, the method 700 includes receiving a command for the second group of playback devices to access a second playback queue of a third playback system. In this context, the third playback system may be associated with a third user-account.

Figure 8B:
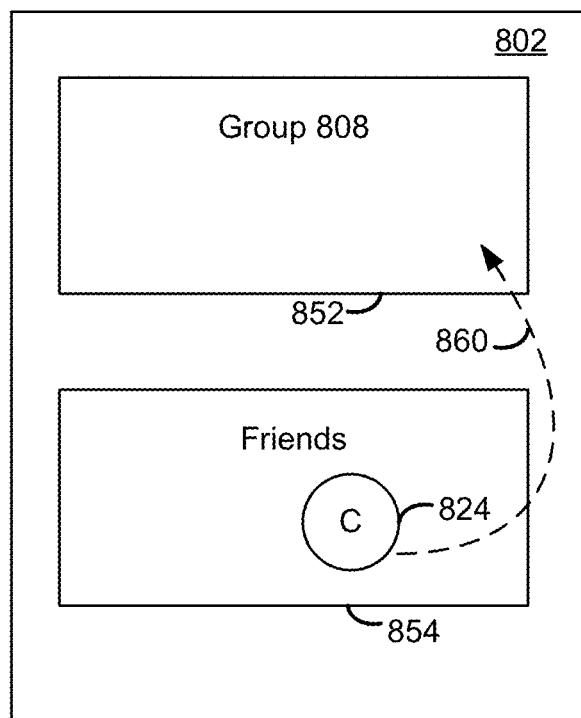
FIG. 8B shows functions performed by an example control device.

Referring to FIG. 8B for example, the control device 802 is shown operating in a subscription management mode. The control device 802 is shown displaying an additional user-account region 854 and a playback queue region 852 within a touchscreen. A subscriber indicator 824 is displayed within the additional user-account region 854. The control device 802 receives a command, perhaps including a touch-and-drag input 860 that moves the subscriber indicator 824 from the additional user-account region 854 to the playback queue region 852. The subscriber indicator 824 identifies user-account C which is associated with the playback system 814. Therefore, the control device 802 may recognize this touch-and-drag input 860 as a command for the group 808 to access the playback queue 816.

At block 708, the method 700 includes in response to receiving the command, configuring the second group of playback devices to access the second playback queue. For example, in response to the received command, the control device 802 may send a command to the playback system 804 for the group 808 to access the playback queue 816. In response, the group 808 may access the playback queue 816.

At block 710, the method 700 includes displaying a second indication that the second group of playback devices is accessing the second playback queue. For example the control device 802 may display the indication 820, which shows that the group 808 is accessing the playback queue 816. The indication 820 may explicitly identify the playback system 814, or as shown in FIG. 8A the indication 820 may identify user-account C which is associated with the playback system 814.

The method 700 may further include, prior to receiving the notification, receiving a command to allow the second playback system to access the first playback queue; and sending a message indicating that the second playback system is allowed to access the first playback queue.

Figure 8C:
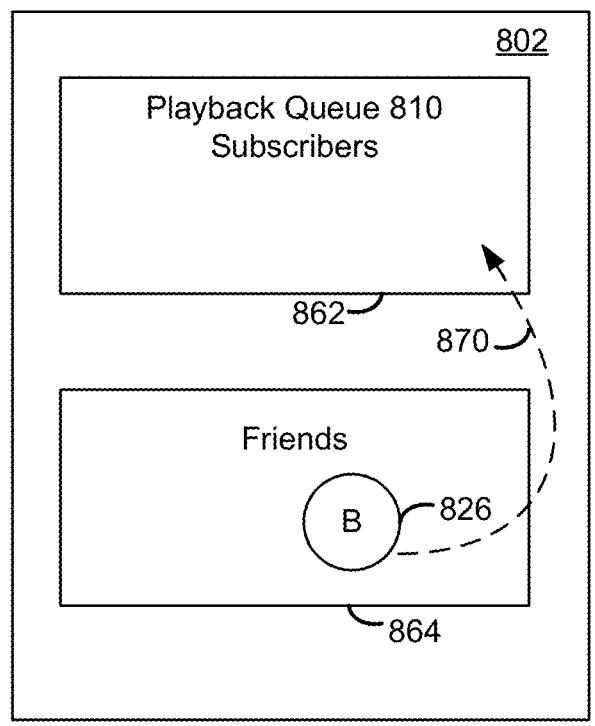
FIG. 8C shows functions performed by an example control device.

As shown in FIG. 8C for example, the control device 802 may receive a touch-and-drag input 870 that moves the subscriber indicator 826 from the additional user-account region 864 to the subscriber region 862. The subscriber indicator 826 identifies user-account B which is associated with the playback system 812. Therefore, the control device 802 may recognize touch-and-drag input 870 as a command to allow the playback system 812 to access the playback queue 810. In response, the control device 802 may send a message indicating that the playback system 812 is allowed to access the playback queue 810. The message may be sent to the playback system 804 and/or the playback system 812.

The method 700 may further include in response to receiving the command, sending a request for the second group of playback devices to access the second playback queue; receiving a message indicating that the second group of playback devices is allowed to access the second playback queue; and causing the second group of playback devices to access the second playback queue.

For example, based on receiving the command for the group 808 to access the playback queue 816, the control device 802 may send, to the playback system 804 a request for the group 808 to access the playback queue 816. Thereafter, either the playback system 804 or the playback system 814 may send a message to the control device 802. The message may indicate that the group 808 is allowed to access the playback queue 816. In response to receiving the message, the control device 802 may cause the group 808 to access the playback queue 816. For example, the control device 802 may send to the playback system 804 a command for the group 808 to access the playback queue 816.

The method 700 may further include receiving a second notification that the second playback system is no longer accessing the first playback queue; and displaying an indication that the second playback system is allowed to access the first playback queue but is no longer accessing the first playback queue.

For example, the control device 802 may receive a second notification that the playback system 812 is no longer accessing the playback queue 810, and in response display the subscriber indicator 826 in a second state that indicates that the playback system 812 is no longer accessing the playback queue 810. The subscriber indicator 826 may appear in the second state similarly to the subscriber indicator 642 of FIG. 6A (e.g., dashed lines, greyed out, etc.).

The method 700 may further include receiving data representing feedback from the second user-account, wherein the feedback is associated with the first playback queue; and displaying an indication of the feedback. For example, the control device 802 may receive, from the playback system 812, data representing feedback from the user-account B regarding media content of the playback queue 810. In response, the control device 802 may display the subscriber indicator 826 in a third state that is indicative of the feedback from the user-account B. For example, the subscriber indicator 826 may appear in a third state similar to that of subscriber indicator 644 of FIG. 6A. More specifically, the subscriber indicator 826 may appear in a form which indicates that the user associated with user-account B is pleased, displeased, or ambivalent, with the media content of playback queue 810 played by the playback system 812. The subscriber indicator 826 appearing in the third state may identify other sentiments of the user associated with user-account B as well.

Figure 9:
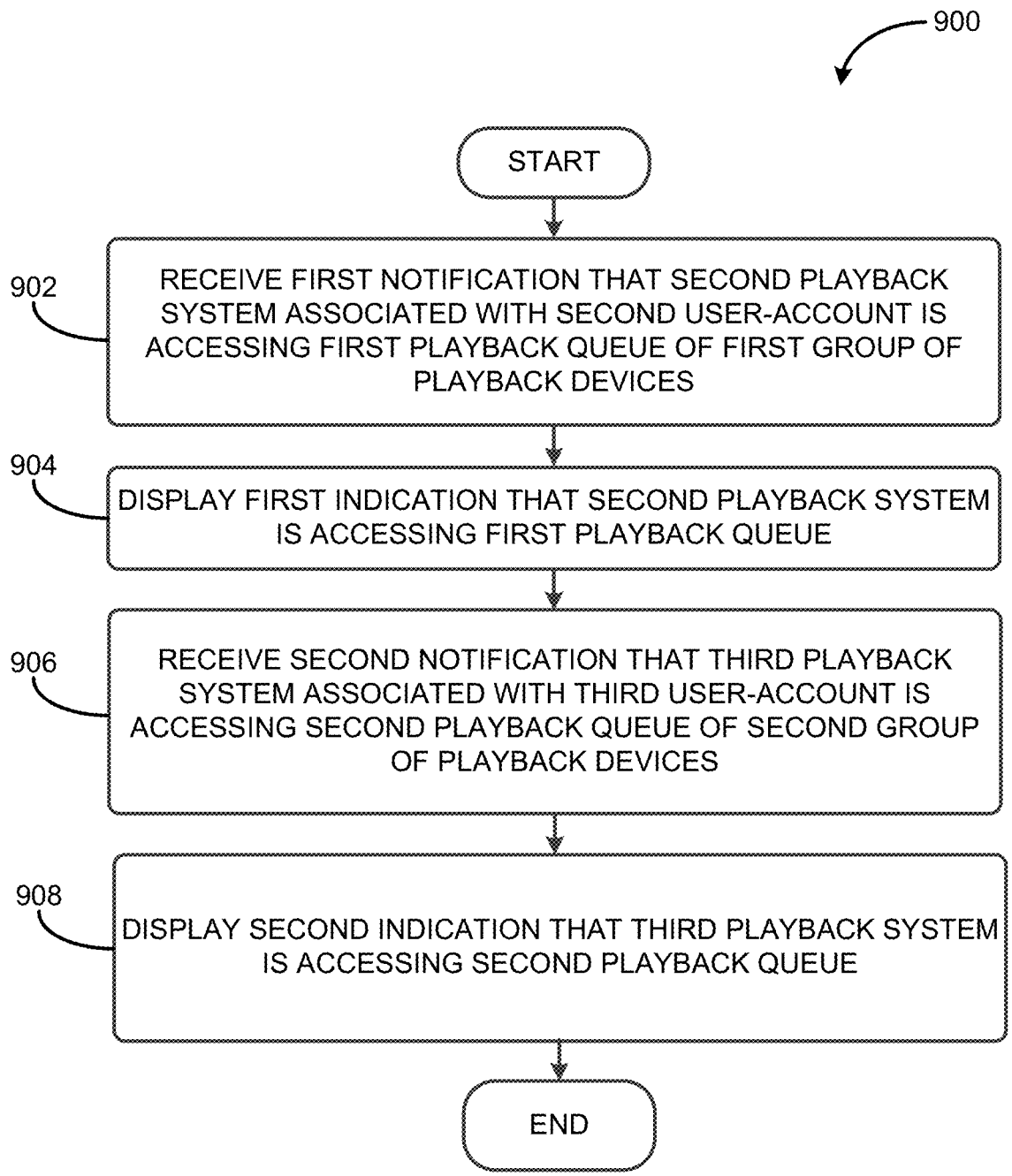
FIG. 9 shows a flow diagram for an example method.

Referring to FIG. 9, the method 900 may be performed by a control device configured to control a first playback system. The first playback system may comprise a first group of one or more playback devices and a second group of one or more playback devices.

Figure 10:
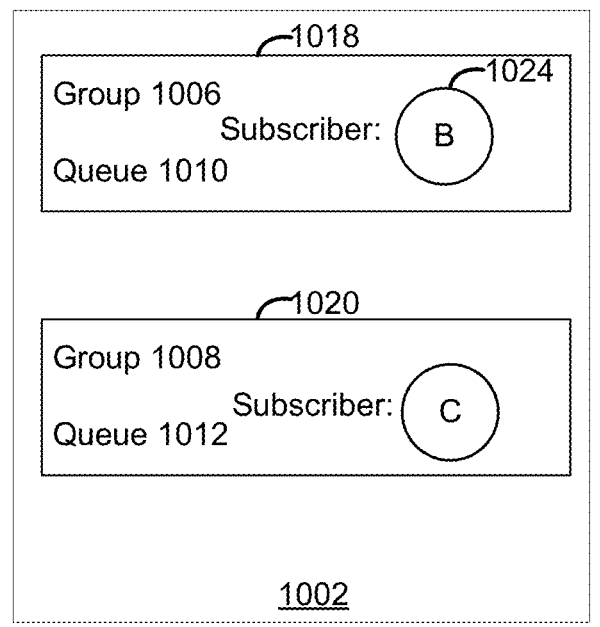
FIG. 10 shows functions performed by example playback systems and an example control device.
Figure 10:
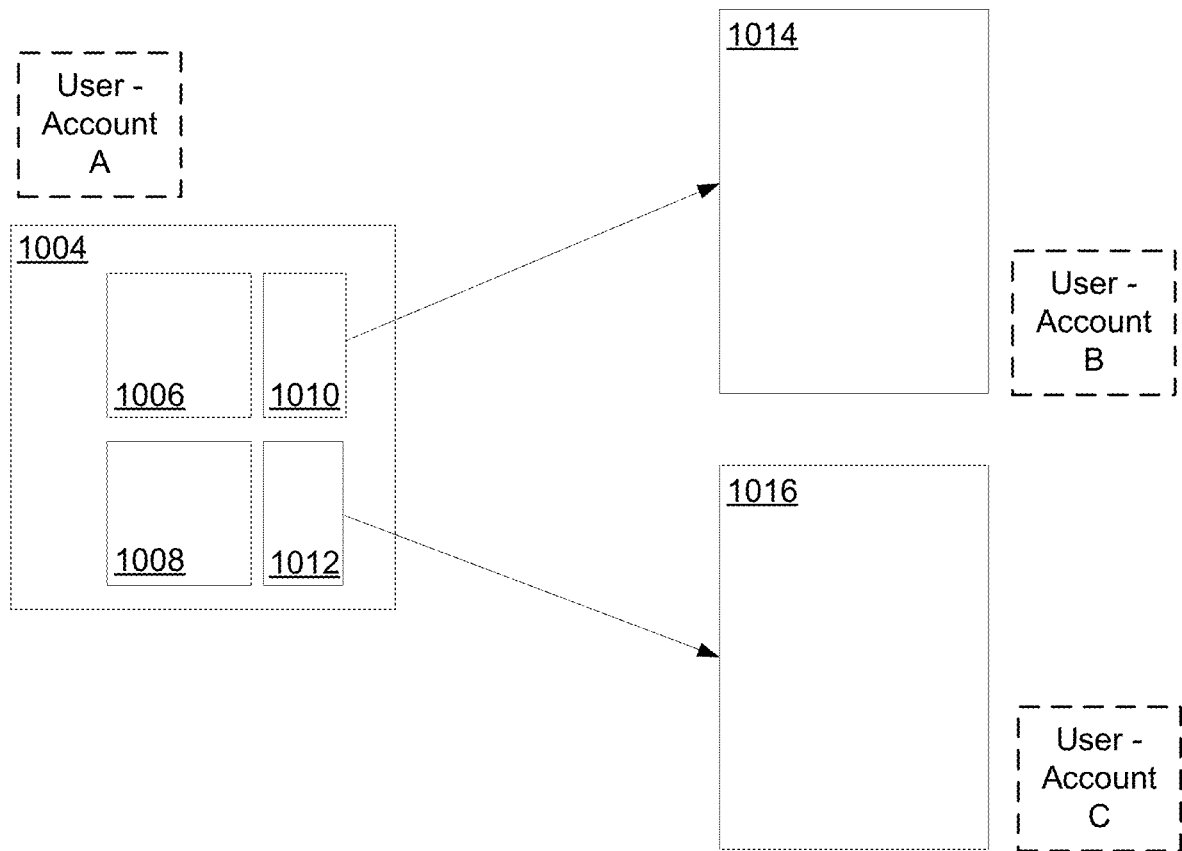

As an example, FIG. 10 depicts a control device 1002 that is configured to control a playback system 1004. The playback system 1004 is associated with user-account A and includes a group 1006 of one or more playback devices and a group 1008 of one or more playback devices. The group 1006 is configured to access the playback queue 1010 for playback of audio content and the group 1008 is configured to access the playback queue 1012 for playback of audio content. FIG. 10 also includes playback system 1014 which is associated with user-account B and playback system 1016 which is associated with user-account C.

At block 902, the method 900 includes receiving a first notification that a second playback system associated with a second user-account is accessing a first playback queue of the first group of playback devices. In this context, the first playback system and the control device are associated with a first user-account.

For example, the control device 1002 may receive a first notification from the playback system 1014 or the playback system 1004. The first notification may indicate that the playback system 1014 is accessing the playback queue 1010. For example, the playback system 1014 may send the first notification as the playback system 1014 is accessing the playback queue 1010. Alternatively, the playback system 1004 may detect that the playback system 1014 is accessing the playback queue 1010 and send the first notification to the control device 1002 in response.

At block 904, the method 900 includes displaying a first indication that the second playback system is accessing the first playback queue.

For instance, the control device 1002 may display indication 1018, which indicates that the playback system 1014 is accessing the playback queue 1010. The indication may explicitly identify the playback system 1014, or as shown in FIG. 10 the indication 1018 may identify user-account B which is associated with the playback system 1014. The indication 1018 may indicate that the group 1006 is also accessing the playback queue 1010.

At block 906, the method 900 includes receiving a second notification that a third playback system associated with a third user-account is accessing a second playback queue of the second group of playback devices.

For instance, the control device 1002 may receive a second notification from the playback system 1004 or the playback system 1016 indicating that the playback system 1016 is accessing the playback queue 1012. For example, the playback system 1016 may send the second notification as the playback system 1016 is accessing the playback queue 1012. Alternatively, the playback system 1004 may detect that the playback system 1016 is accessing the playback queue 1012 and send the second notification to the control device 1002 in response.

At block 908, the method 900 includes displaying a second indication that the third playback system is accessing the second playback queue.

For instance, the control device 1002 may display indication 1020, which indicates that the playback system 1016 is accessing the playback queue 1012. The indication may explicitly identify the playback system 1016, or as shown in FIG. 10 the indication 1020 may identify user-account C which is associated with the playback system 1016. The indication 1020 may indicate that the group 1008 is also accessing the playback queue 1012.

The method 900 may further include prior to receiving the first notification, receiving a command to allow the second playback system to access the first playback queue; and sending a message indicating that the second playback system is allowed to access the first playback queue.

For example, the control device 1002 may, prior to receiving the first notification, receive a command to allow the playback system 1014 to access the playback queue 1010. The control device 1002 may receive the command in a manner similar to functions of the control device 802 described above with reference to FIG. 8C. After receiving the command, the control device 1002 may send to the playback system 1004 and/or the playback system 1014 a message indicating that the playback system 1014 is allowed to access the playback queue 1010.

The method 900 may further include receiving a second notification that the second playback system is no longer accessing the first playback queue; and displaying an indication that the second playback system is allowed to access the first playback queue but is no longer accessing the first playback queue.

For example, the control device 1002 may receive an indication that the playback system 1014 is no longer accessing the playback queue 1010, and in response display the subscriber indicator 1024 in a second state that indicates that the playback system 1014 is no longer accessing the playback queue 1010. The subscriber indicator 1024 may appear in the second state similarly to the subscriber indicator 642 of FIG. 6A (e.g., dashed lines, greyed out, etc.).

Figure 11A:
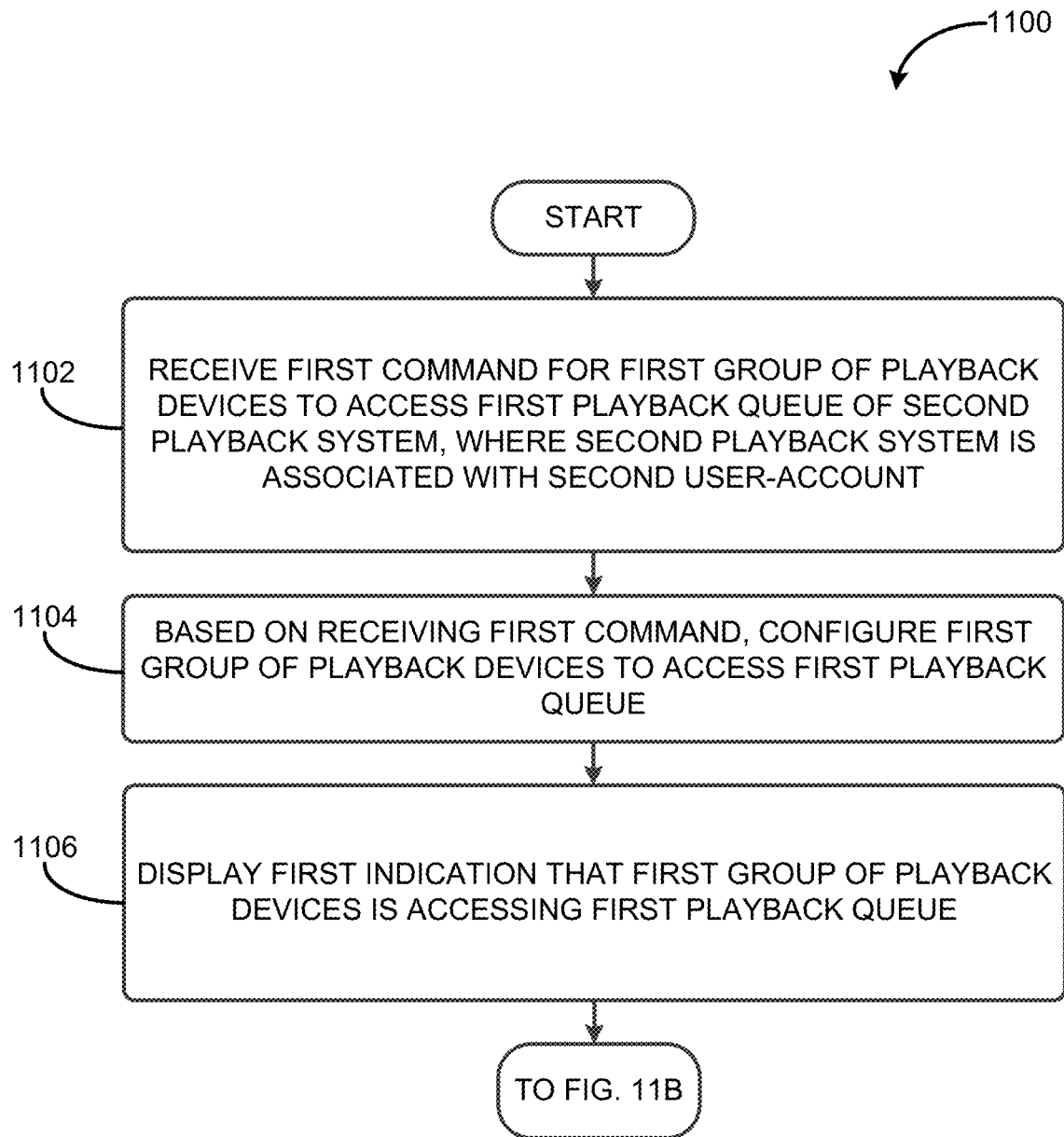
FIG. 11A shows a flow diagram for an example method.
Figure 11B:
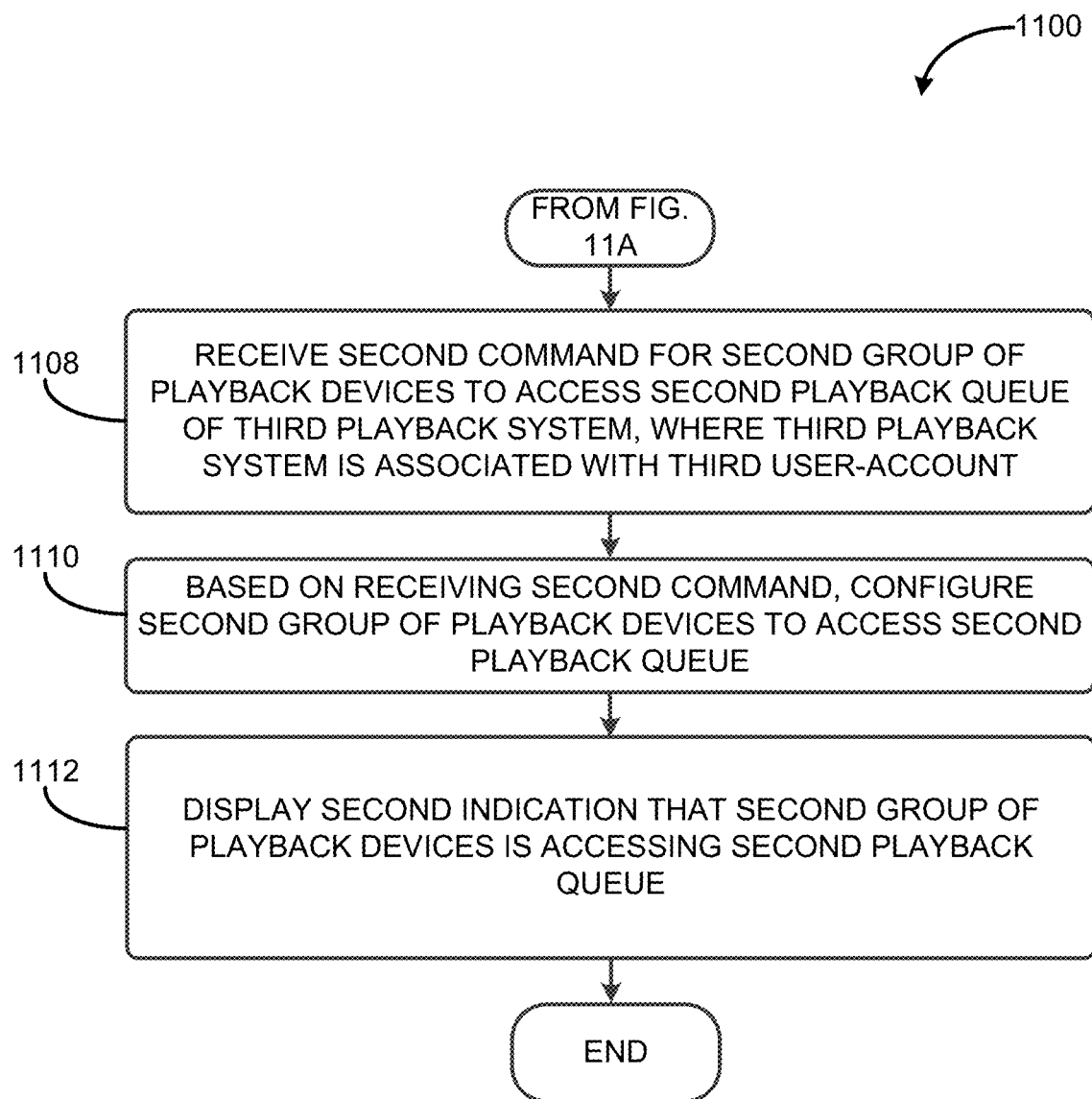
FIG. 11B shows a flow diagram for an example method.

Referring to FIGS. 11A and 11B, the method 1100 may be performed by a control device configured to control a first playback system. The first playback system may comprise a first group of one or more playback devices and a second group of one or more playback devices.

Figure 12:
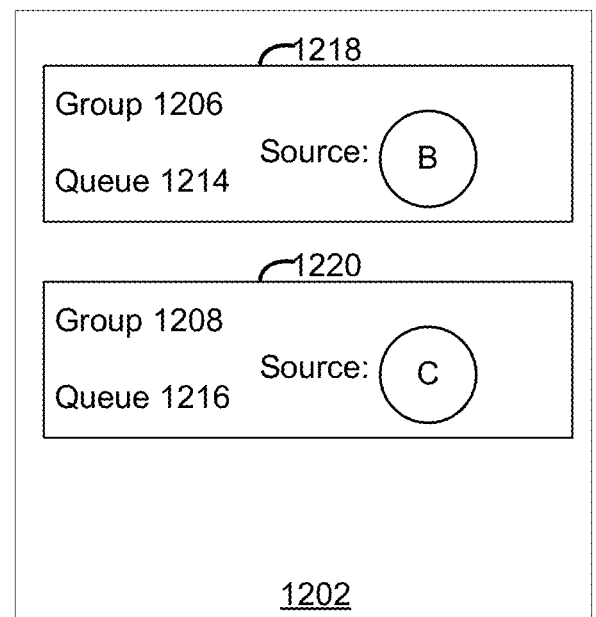
FIG. 12 shows functions performed by example playback systems and an example control device.
Figure 12:
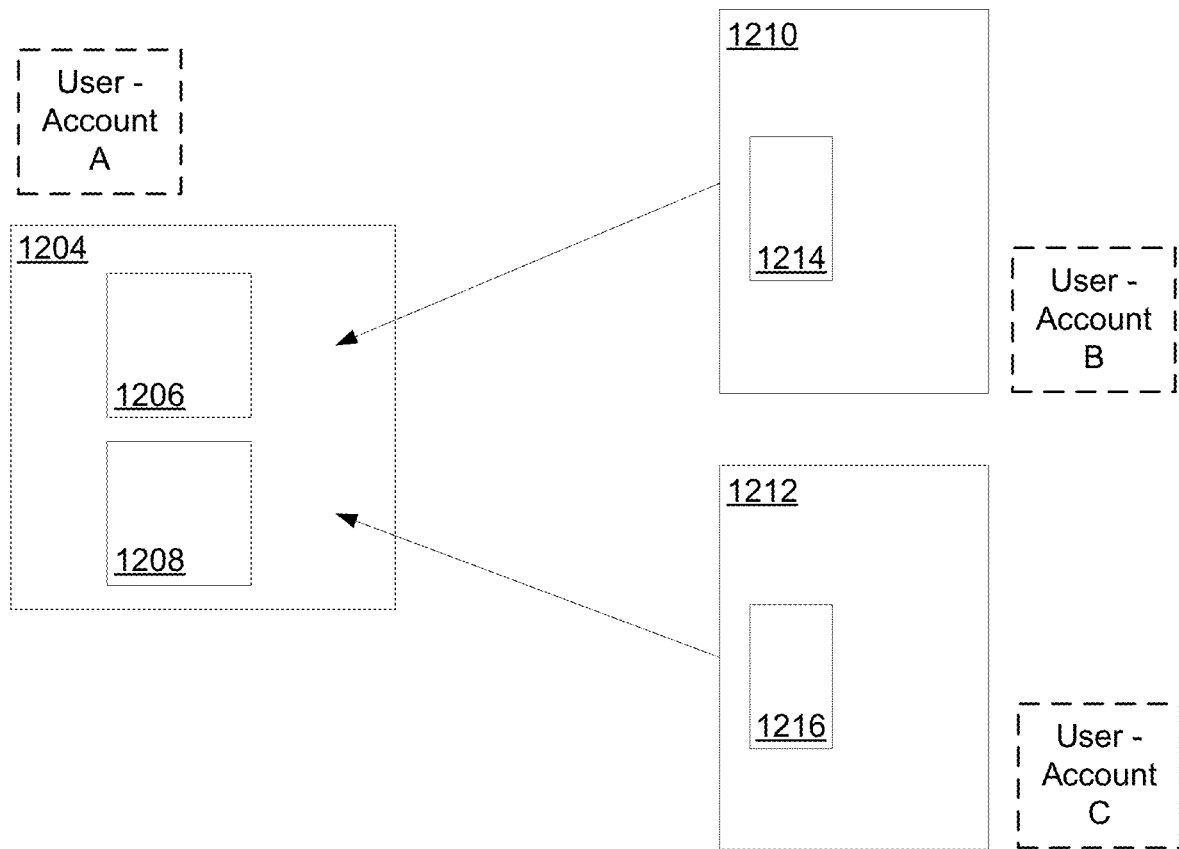

As an example, FIG. 12 depicts a control device 1202 that is configured to control a playback system 1204. The playback system 1204 is associated with user-account A and includes a group 1206 of one or more playback devices and a group 1208 of one or more playback devices. FIG. 12 also includes playback system 1210 which is associated with user-account B and playback system 1212 which is associated with user-account C. The playback system 1210 is configured to access playback queue 1214 for playback of audio content and the playback system 1212 is configured to access playback queue 1216 for playback of audio content.

At block 1102, the method 1100 includes receiving a first command for the first group of playback devices to access a first playback queue of a second playback system. The second playback system is associated with a second user-account.

For example, the control device 1202 may receive a command for the group 1206 to access the playback queue 1214. The command may be received in a manner similar to that depicted in FIG. 8B and related description above.

At block 1104, the method 1100 includes, based on receiving the first command, causing the first group of playback devices to access the first playback queue. For example, the control device 1202 may send a command to the playback system 1204 for the group 1206 to access the playback queue 1214. In response to the command, the group 1206 may access the playback queue 1214.

At block 1106, the method 1100 includes displaying a first indication that the first group of playback devices is accessing the first playback queue. For example the control device 1202 may display the indication 1218, which indicates that the group 1206 is accessing the playback queue 1214. The indication 1218 may explicitly identify the playback system 1210, or as shown in FIG. 12 the indication 1218 may identify user-account B which is associated with the playback system 1210.

At block 1108, the method 1100 includes receiving a second command for the second group of playback devices to access a second playback queue of a third playback system. In this context, the third playback system is associated with a third user-account.

For example, the control device 1202 may receive a command for the group 1208 to access the playback queue 1216. The command may be received in a manner similar to that depicted in FIG. 8B and related description above.

At block 1110, the method 1100 includes, based on receiving the second command, causing the second group of playback devices to access the second playback queue. For example, the control device 1202 may send a command to the playback system 1204 for the group 1208 to access the playback queue 1216. In response to the command, the group 1208 may access the playback queue 1216.

At block 1112, the method 1100 includes displaying a second indication that the second group of playback devices is accessing the second playback queue. For example the control device 1202 may display the indication 1220, which indicates that the group 1208 is accessing the playback queue 1216. The indication 1220 may explicitly identify the playback system 1212, or as shown in FIG. 12 the indication 1220 may identify user-account C which is associated with the playback system 1212.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Examples described herein involve, among other things, a control device configuring a first playback device associated with a first user-account to (i) play media content from a playback queue comprising one or more audio tracks stored at a network location and (ii) enable one or more other user-accounts associated with other playback devices to subscribe to the playback queue; the control device receiving a subscription indication that a second user-account associated with a second playback device has subscribed to the playback queue; and in response to receiving the subscription indication, the control device displaying a subscriber indicator showing that the second user-account has subscribed to the playback queue. Other aspects of the examples will be made apparent in the remainder of the description herein.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method to be performed by one or more servers of a computing system, the method comprising:
  receiving, via a network interface from a first computing device, an instruction to enable subscription to a first playback queue associated with a first media playback system, wherein the first media playback system comprises a first playback device, and wherein one or more first accounts are registered with the first media playback system;
  in response to the instruction, enabling one or more second user accounts to subscribe to the first playback queue via one or more wide area networks, wherein the one or more second user accounts are registered with respective second media playback systems in respective second households;
  after enabling the one or more second user accounts associated with one or more second playback devices to subscribe to the first playback queue, receiving, via the network interface from a particular second media playback system, a request to subscribe to the first playback queue; and
  in response to the request to subscribe to the first playback queue: (i) sending, via the network interface, one or more messages that update a control interface of the first computing device to display a subscriber indication showing that a particular second user account registered with the particular second media playback system has subscribed to the first playback queue and (ii) sending, via the network interface, one or more messages that populate a second playback queue associated with a second playback device of the particular second media playback system with audio tracks of the first playback queue.

2. The method of claim 1, further comprising:
  while the first playback device is playing back a particular audio track of the first playback queue, receiving a first data stream with timing information corresponding to the playback of the particular audio track by the first playback device; and
  sending, to the particular second media playback system, a second data stream with the timing information corresponding to the playback of the particular audio track by the first playback device, wherein the second playback device plays the particular audio track according to the timing information at the substantially same time as the first playback device.

3. The method of claim 1, further comprising:
  hosting the first playback queue, and wherein the first playback queue identifies respective network locations of the audio tracks indicated within the first playback queue, and wherein the first playback device streams the audio tracks indicated within the first playback queue from the respective network locations during playback.

4. The method of claim 3, further comprising:
  hosting the second playback queue, wherein the second playback device streams the audio tracks indicated within the second playback queue from the respective network locations during playback.

5. The method of claim 1, further comprising:
  receiving, via the network interface, status information indicating whether the particular second media playback system is currently playing back the first playback queue,
  when the particular second media playback system is currently playing back the first playback queue, sending one or more instructions to update the control interface of the first computing device to display a graphical indication that the particular second user account is playing back the first playback queue; and
  when the particular second media playback system is not currently playing back the first playback queue, sending one or more instructions to update the control interface of the first computing device to display the subscriber indication showing that the particular second user account has subscribed to the first playback queue.

6. The method of claim 1, further comprising:
receiving, from the first media playback system, one or more message indicating that the first playback device is playing back the first playback queue; and
sending, via the network interface, an invitation for the particular second media playback system to start playing back the first playback queue with the first playback device.

7. The method of claim 1, wherein a network location of a first audio track indicated within the first playback queue is at one or more servers of a first streaming audio service, and wherein a network location of a second audio track indicated within the first playback queue is at one or more servers of a second streaming audio service.

8. A computing system comprising:
a network interface;
one or more processors;
data storage having stored therein instructions executable by the one or more processors to cause the computing system to perform a method comprising
receiving, via the network interface from a first computing device, an instruction to enable subscription to a first playback queue associated with a first media playback system, wherein the first media playback system comprises a first playback device, and wherein one or more first accounts are registered with the first media playback system;
in response to the instruction, enabling one or more second user accounts to subscribe to the first playback queue via one or more wide area networks, wherein the one or more second user accounts are registered with respective second media playback systems in respective second households;
after enabling the one or more second user accounts associated with one or more second playback devices to subscribe to the first playback queue, receiving, via the network interface from a particular second media playback system, a request to subscribe to the first playback queue; and
in response to the request to subscribe to the first playback queue: (i) sending, via the network interface, one or more messages that update a control interface of the first computing device to display a subscriber indication showing that a particular second user account registered with the particular second media playback system has subscribed to the first playback queue and (ii) sending, via the network interface, one or more messages that populate a second playback queue associated with a second playback device of the particular second media playback system with audio tracks of the first playback queue.

9. The computing system of claim 8, wherein the method further comprises:
while the first playback device is playing back a particular audio track of the first playback queue, receiving a first data stream with timing information corresponding to the playback of the particular audio track by the first playback device; and
sending, to the particular second media playback system, a second data stream with the timing information corresponding to the playback of the particular audio track by the first playback device, wherein the second playback device plays the particular audio track according to the timing information at the substantially same time as the first playback device.

10. The computing system of claim 8, wherein the method further comprises:
hosting the first playback queue, and wherein the first playback queue identifies respective network locations of the audio tracks indicated within the first playback queue, and wherein the first playback device streams the audio tracks indicated within the first playback queue from the respective network locations during playback.

11. The computing system of claim 8, wherein the method further comprises:
hosting the second playback queue, wherein the second playback device streams the audio tracks indicated within the second playback queue from the respective network locations during playback.

12. The computing system of claim 8, wherein the method further comprises:
receiving, via the network interface, status information indicating whether the particular second media playback system is currently playing back the first playback queue,
when the particular second media playback system is currently playing back the first playback queue, sending one or more instructions to update the control interface of the first computing device to display a graphical indication that the particular second user account is playing back the first playback queue; and
when the particular second media playback system is not currently playing back the first playback queue, sending one or more instructions to update the control interface of the first computing device to display the subscriber indication showing that the particular second user account has subscribed to the first playback queue.

13. The computing system of claim 8, wherein the method further comprises:
receiving, from the first media playback system, one or more message indicating that the first playback device is playing back the first playback queue; and
sending, via the network interface, an invitation for the particular second media playback system to start playing back the first playback queue with the first playback device.

14. The computing system of claim 8, wherein a network location of a first audio track indicated within the first playback queue is at one or more servers of a first streaming audio service, and wherein a network location of a second audio track indicated within the first playback queue is at one or more servers of a second streaming audio service.

15. A non-transitory, computer-readable medium having instructions stored thereon that, when executed by one or more processors cause a computing system to perform a method comprising:
receiving, via a network interface from a first computing device, an instruction to enable subscription to a first playback queue associated with a first media playback system, wherein the first media playback system comprises a first playback device, and wherein one or more first accounts are registered with the first media playback system;
in response to the instruction, enabling one or more second user accounts to subscribe to the first playback queue via one or more wide area networks, wherein the one or more second user accounts are registered with respective second media playback systems in respective second households;

after enabling the one or more second user accounts associated with one or more second playback devices to subscribe to the first playback queue, receiving, via the network interface from a particular second media playback system, a request to subscribe to the first playback queue; and in response to the request to subscribe to the first playback queue: (i) sending, via the network interface, one or more messages that update a control interface of the first computing device to display a subscriber indication showing that a particular second user account registered with the particular second media playback system has subscribed to the first playback queue and (ii) sending, via the network interface, one or more messages that populate a second playback queue associated with a second playback device of the particular second media playback system with audio tracks of the first playback queue.

16. The non-transitory, computer-readable medium of claim 15, wherein the method further comprises:

while the first playback device is playing back a particular audio track of the first playback queue, receiving a first data stream with timing information corresponding to the playback of the particular audio track by the first playback device; and sending, to the particular second media playback system, a second data stream with the timing information corresponding to the playback of the particular audio track by the first playback device, wherein the second playback device plays the particular audio track according to the timing information at the substantially same time as the first playback device.

17. The non-transitory, computer-readable medium of claim 15, wherein the method further comprises:

hosting the first playback queue, and wherein the first playback queue identifies respective network locations of the audio tracks indicated within the first playback queue, and wherein the first playback device streams the audio tracks indicated within the first playback queue from the respective network locations during playback.

18. The non-transitory, computer-readable medium of claim 15, wherein the method further comprises:

hosting the second playback queue, wherein the second playback device streams the audio tracks indicated within the second playback queue from the respective network locations during playback.

19. The non-transitory, computer-readable medium of claim 15, wherein the method further comprises:

receiving, via the network interface, status information indicating whether the particular second media playback system is currently playing back the first playback queue, when the particular second media playback system is currently playing back the first playback queue, sending one or more instructions to update the control interface of the first computing device to display a graphical indication that the particular second user account is playing back the first playback queue; and when the particular second media playback system is not currently playing back the first playback queue, sending one or more instructions to update the control interface of the first computing device to display the subscriber indication showing that the particular second user account has subscribed to the first playback queue.

20. The non-transitory, computer-readable medium of claim 15, wherein the method further comprises:

receiving, from the first media playback system, one or more message indicating that the first playback device is playing back the first playback queue; and sending, via the network interface, an invitation for the particular second media playback system to start playing back the first playback queue with the first playback device.

* * * * *